Patented June 9, 1925.

1,541,336

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

COLD-MOLDED PRODUCT AND PROCESS OF MAKING SAME.

No Drawing. Application filed February 14, 1923. Serial No. 619,063.

*To all whom it may concern:*

Be it known that I, CARLETON ELLIS, a citizen of the United States, and a resident of Montclair, in the county of Essex and State of New Jersey, have invented certain new and useful Improvements in Cold-Molded Products and Processes of Making Same, of which the following is a specification.

This invention relates to a cold molded product and to the process of making same and relates particularly to plastic material containing a glyceride of resin and phthalic acid incorporated with a suitable filler.

When a natural resin such as one of the copal resins or preferably ordinary rosin is heated with phthalic acid or phthalic anhydride and glycerol reaction takes place with the production of a complex resin in which the rosin and phthalic acid become quite completely combined with the glycerol. Thus 100 parts rosin, 21 parts of phthalic anhydride and 24 parts of glycerol heated to 280–290° C. with agitation yield a resinous complex soluble in acetone or mixtures of acetone and benzol or alcohol and benzol, such solutions being adapted to impregnate filling material thereby forming a plastic composition which is capable of being molded in the cold and subsequently hardened, after removal from the mold, by exposure to a baking heat. Similarly 100 parts of rosin, 50 parts of phthalic anhydride and 48 parts of glycerol may be converted into a complex. In like manner a complex in which an excess of glycerol over that required to satisfy combining proportions is made from 75 parts of rosin, 50 parts of phthalic anhydride and 43 parts of glycerol.

The above resinous complexes differ from any reaction products of rosin, glycerol and phthalic anhydride (or acid) heretofore known, in having substantially lower acid numbers and in having improved physical properties. Such products and the process of making same are claimed in my co-pending cases 609,134 and 609,136.

Any of these resinous complexes dissolved in a suitable solvent may be admixed with appropriate fillers and the solvent removed by exposure to the air or gentle heating until the amount present is reduced to that point at which the composition may be molded in the cold. In carrying out this operation the material in the form of a powder or in granular form is weighed and charged into a suitable mold being then subjected in a tapping press to a pressure of form 5,000 to 30,000 pounds per square inch. If care is taken to have the drying progress to the point at which just the right amount of solvent is present so that the mixture is not sticky but on pressing firmly between the fingers will adhere slightly, it will be found that on exposure to the high pressure of the tapping press a molded article of smooth surface is obtainable. The molded pieces are preferably air dried for 24 hours and exposed to a temperature of about 70° C. for 5 or 6 hours in order to eliminate a good part of the residual solvent. They are then baked in an oven at a gradually increasing temperature, preferably for one-half hour at 150–180° C. and carrying the temperature to 290–300° C. for a period of one-half to one hour. A longer period of baking at a high temperature tends to weaken the article slightly in some cases.

The cold molding procedure permits molded articles to be shaped or stamped out at a high rate of speed and to be hardened after removal from the molds so that the latter are always available for production purposes. This is a great advantage as regards output in comparison with methods of hot molding. The composition in question may however be used for hot molding purposes if desired.

The presence of a small amount of drying oil such as Chinese wood oil, linseed oil, fish oil and the like is desirable because it renders the material more coherent without being sticky; 1 or 2 per cent of tung oil therefore may be added to the mixtures when desired and such additions form a part of the present invention.

The most desirable filler for a composition possessing high heat resistance is asbestos fibre. This may be a mixture of long and short fibered material. Various other mineral fillers may be added. For example a small amount of talc decreases the wear or erosion of the molds. In addition to the various fibres and powdered mineral fillers commonly employed in the plastic art various organic fillers such as saw dust, wood flour, cotton flock and the like may be used when the material does not require so great a degree of heat resistance.

In using asbestos as a filler good results may be obtained by employing only 15 per cent of the resinous complex binder in the composition. It may be mixed with the filler by the use of a 50 per cent solution of the resin complex in a volatile solvent. One or 2 per cent of tung oil likewise is added. Any of the formulæ given above for the resinous complex may be used and it may be stated that variations in the proportions beyond those specified may be made to advantage in some cases. However the formulæ set forth serve for purposes of illustration. In like manner the phthalic acid or anhydride may be replaced wholly or in part by other organic acids and anhydrides such as citric, tartaric, malic, maleic, succinic and the like.

The composition also may be cheapened by the addition of various extending or diluting materials such as pitch, asphalt and other cheapening substances. On the other hand the resin complex may be incorporated with a cold molding composition made primarily from asphalt, gilsonite, stearine pitch and the like and suitable fillers in order to strengthen such asphaltic binder to a certain extent.

Other synthetic resinous compounds such as resins made from acetone and formaldehyde, from furfural and aniline, furfural, phenol and acetone, phenol and formaldehyde, and various other distinctive types of synthetic resins may be incorporated in some cases.

To recapitulate the invention in its preferred form comprises as a product a powder or granular material or shaped mass containing a filler preferably in major proportion preferably largely asbestos and a binder preferably in minor proportion preferably present to the extent of 15 to 30 per cent, such binding material comprising or containing a resinous complex formed by reacting on glycerol with a natural resin such as ordinary rosin and an organic acid or anhydride such as phthalic anhydride. In the composition preferably there is present a small amount of a drying oil. The articles made from such composition by molding preferably in a cold press are withdrawn from the mold and subjected to a baking heat to bring about hardening to a firm, tough, heat resistant, fashioned article. During the baking the heat should not rise so rapidly as to cause blistering and in some cases in order to avoid too rapid reaction in baking a retarding agent such as glucose, glycol or glycerol may be present. The process involved herein in its more detailed aspects involves heating rosin, phthalic anhydride and glycerol until they react to form a resinous complex, dissolving the latter in a volatile solvent, incorporating a small amount of tung oil or nitrocellulose or both, admixing with an asbestos filler, exposing the mixture to the air for perhaps 24 hours to allow the solvent to pass off to a large extent and when the mixture has reached an appropriate condition of dryness but is still coherent the mass is subjected to tapping pressure to shape to the desired form; the operation of baking or stoving being carried out as indicated above.

What I claim is:—

1. A molded article shaped in the cold and hardened by baking containing a rosin phthalic glycerol resinous complex serving as a binder, said resinous complex having a low acid number.

2. A molded article shaped in the cold and hardened by baking containing a rosin phthalic glycerol resinous complex serving as a binder and a filler, said resinous complex having a low acid number.

3. A molded article shaped in the cold and hardened by baking containing a rosin phthalic glycerol resinous complex serving as a binder and a filler comprising asbestos, said resinous complex having a low acid number.

4. A molded article shaped in the cold and hardened by baking containing a rosin phthalic glycerol resinous complex serving as a binder and a filler comprising a major proportion of asbestos, said resinous complex having a low acid number.

5. The process of making a molded article which comprises incorporating about 15 per cent of a rosin phthalic glycerol resinous complex having a low acid number, with a filler comprising asbestos, shaping the material in the cold and baking to produce a heat-resistant product.

6. The process of making a molded article which comprises incorporating a solution in a volatile solvent of a resin phthalic glycerol resinous complex having a low acid number, with a major proportion of a mineral filler comprising asbestos, drying to remove most of the solvent to obtain a non-sticky but coherent material, subjecting in a cold mold to a high pressure, removing the shaped article from the mold, drying at 70° C. and then baking at a temperature gradually increasing to approximately 300° C.

7. The process which comprises incorporating with a mineral filler a complex resinous binder made from rosin, glycerol and an organic acid, such binder having a low acid number subjecting the material to high pressure in a cold mold, removing the article from the mold and subsequently exposing to a gradually increasing temperature whereby a baked, heat-resistant article is obtained.

CARLETON ELLIS.